US012637548B2

(12) United States Patent　　(10) Patent No.:　US 12,637,548 B2
Karch et al.　　　　　　　　　　(45) Date of Patent:　　May 26, 2026

(54) FIBER COMPOSITE STRUCTURE AND METHOD FOR MANUFACTURING A FIBER COMPOSITE STRUCTURE

(71) Applicants:Airbus Defence and Space GmbH, Taufkirchen (DE); Airbus (S.A.S.), Blagnac (FR)

(72) Inventors: Christian Karch, Neubiberg (DE); Alois Friedberger, Taufkirchen (DE)

(73) Assignees: Airbus Defence and Space GmbH, Taufkirchen (DE); Airbus (S.A.S.), Blagnac (FR)

( * ) Notice: Subject to any disclaimer, the term of this patent is extended or adjusted under 35 U.S.C. 154(b) by 786 days.

(21) Appl. No.: 17/964,582

(22) Filed: Oct. 12, 2022

(65) Prior Publication Data

US 2023/0122380 A1　　Apr. 20, 2023

(30) Foreign Application Priority Data

Oct. 14, 2021　(EP) ..................................... 21202628

(51) Int. Cl.
*C08J 5/04*　　　　(2006.01)
*C08J 5/24*　　　　(2006.01)

(52) U.S. Cl.
CPC ............... *C08J 5/043* (2013.01); *C08J 5/042* (2013.01); *C08J 5/243* (2021.05); *C08J 5/244* (2021.05); *C08J 2333/12* (2013.01)

(58) Field of Classification Search
CPC ..... B29C 70/021; B29C 70/023; B29C 70/08; B29C 70/083; B29C 70/20; B29C 70/68;

B29C 70/72; B29C 70/76; B29C 70/88; B29L 2031/7172; B32B 2262/0223; B32B 2262/101; B32B 2262/106; B32B 3/266;

(Continued)

(56) References Cited

U.S. PATENT DOCUMENTS

2005/0048858 A1　3/2005　Wellman
2011/0024562 A1　2/2011　Kastner et al.

(Continued)

FOREIGN PATENT DOCUMENTS

CN　　　110248798　A　　9/2019
DE　10 2013 017898　A1　　4/2015

(Continued)

OTHER PUBLICATIONS

Chinese First Office Action in CN Application No. 202211251685.8 dated Aug. 21, 2025, 8 pages.

(Continued)

*Primary Examiner* — Lawrence D Ferguson
(74) *Attorney, Agent, or Firm* — KDW Firm PLLC

(57) ABSTRACT

A fiber composite structure includes a base structure being formed of a first fiber composite material that includes first fiber bundles embedded in a first matrix material, wherein the base structure includes an opening defined by first fiber bundles which include first sections and a second section that continuously or uninterruptedly interconnects the first sections, wherein the second section forms a bay that defines a part of the circumference of the opening. The fiber composite structure further includes a functional structure positioned in the opening of the base structure and joined with the first fiber composite material of the base structure.

17 Claims, 2 Drawing Sheets

(58) Field of Classification Search
CPC ......... B32B 5/26; C08J 2333/12; C08J 5/042;
C08J 5/043; C08J 5/243; C08J 5/244;
C30B 15/30; Y02T 50/40
See application file for complete search history.

(56) References Cited

U.S. PATENT DOCUMENTS

| | | |
|---|---|---|
| 2011/0204611 A1 | 8/2011 | Ziegler et al. |
| 2016/0052233 A1* | 2/2016 | Kaigome ................. B32B 5/26 |
| | | 428/137 |
| 2020/0130297 A1 | 4/2020 | Escowitz et al. |
| 2021/0023800 A1 | 1/2021 | Escowitz et al. |

FOREIGN PATENT DOCUMENTS

| | | |
|---|---|---|
| EP | 0 572 752 A1 | 12/1993 |
| JP | S 61 60371 A | 3/1986 |

OTHER PUBLICATIONS

Ahamed, Jasim et al, "Ply-interleaving technique for joining hybrid carbon/glass fibre composite materials," Composites: Part A, www.elsevier.com/locate/compositesa, Jan. 25, 2016.
European Search Report for Application No. 21202628 dated Mar. 23, 2022.
Decision to Grant EP Application No. 21202628.0 dated Nov. 6, 2025, 3 pages.

\* cited by examiner

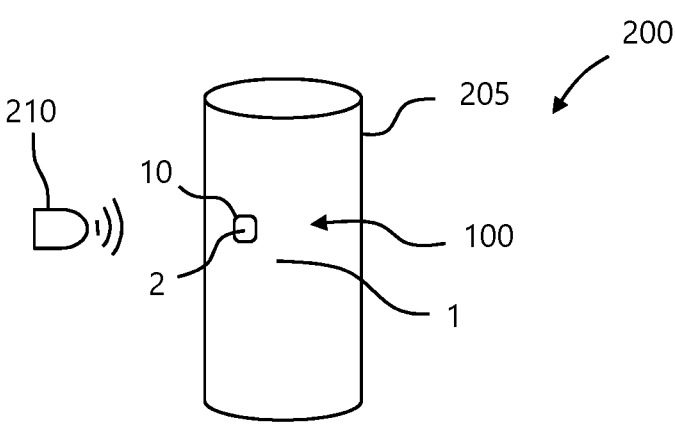
Fig. 1
Fig. 2
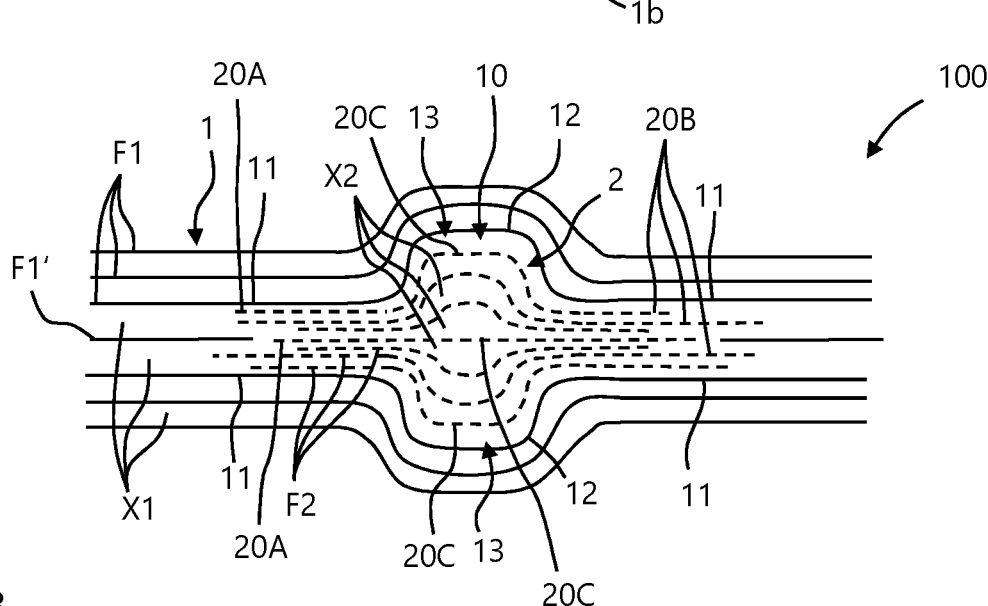
Fig. 3

FIBER COMPOSITE STRUCTURE AND METHOD FOR MANUFACTURING A FIBER COMPOSITE STRUCTURE

CROSS-REFERENCE TO RELATED APPLICATION

This application claims priority to EP Patent Application No. 21202628.0 filed Oct. 14, 2021, the entire disclosure of which is incorporated by reference herein.

TECHNICAL FIELD

The disclosure herein pertains to a fiber composite structure and to a method for manufacturing a fiber composite structure.

BACKGROUND

Fiber reinforced composite structures, such as carbon fiber reinforced plastics or glass fiber reinforced plastics, are commonly used in various fields due to their high mechanical strength at low weight. In particular, in the aircraft and vehicle industry, fiber reinforced structures are employed as structural parts such as carriers, skins, covers, and so on. There exist also ideas to realize fuel tanks for gaseous or liquid fuel at least partially from fiber reinforced structures. In some situations, it is desirable to provide a fiber reinforced structure that is not only a load bearing part but further integrates other functionalities, such as, for example as an antenna, a radome, or others. In this kind of situations, the fiber reinforced structure typically includes a combination of materials to meet the combined requirements.

Jasim Ahamed et al. in "Ply-interleaving Technique for Joining Hybrid Carbon/Glass Fibre Composite Materials", Composites Part A Applied Science and Manufacturing (January 2016), investigate a hybrid composite load-bearing antenna that integrates a carbon fibre composite structural skin, which is electrically conductive, with an electrically insulating, radar transparent window fabricated from dielectric composite materials such as glass or quartz fibre composite. The carbon fiber composite skin includes a cut out at which the carbon fibers end. The glass or quarts fiber composite is arranged in the cut out, and the glass or quarts fiber plies are interleaved with the carbon fiber plies to achieve efficient load transfer between the transparent window and the carbon fibre composite structural skin.

SUMMARY

It is one of the objects of the disclosure herein to improve the mechanical strength of a fiber composite structure that includes a functional structure integrated in a base structure.

To this end, the disclosure herein provides a fiber composite structure and a method.

According to a first aspect of the disclosure herein, a fiber composite structure comprises a base structure being formed of a first fiber composite material that includes a plurality of first fiber bundles embedded in a first matrix material, wherein the base structure comprises an opening defined by first fiber bundles which include first sections, that preferably extend linearly or generally linear, and a second section that continuously or uninterruptedly interconnects the first sections, wherein the second section forms a bay that defines a part of the circumference of the opening. The fiber composite structure further includes a functional structure positioned in the opening of the base structure and joined with the first fiber composite material of the base structure.

A second aspect of the disclosure herein provides a method for manufacturing a fiber composite structure, in particular for manufacturing the fiber composite structure of the first aspect of the disclosure herein. The method includes preparing a base structure by positioning a plurality of first fiber bundles such that at least some of first fiber bundles have preferably linearly extending first sections and a second section that continuously or uninterruptedly interconnects the first sections, wherein the second section forms a bay that defines a part of the circumference of an opening of the base structure. The method further includes positioning a functional structure within the opening of the base structure, and joining the functional structure and the base structure by curing a first matrix embedding the first fiber bundles.

One of the ideas on which the disclosure herein is based is that the first fiber bundles are not interrupted or cut in the region where the opening is formed in the base structure. Rather, the first fiber bundles are arranged such that they limit or define the opening and extend continuously from a first side of the opening along a part of the circumference to a second side of the opening. In other words, the first fiber bundles of the base structure are not cut but extend continuously and, to define the opening, are arranged to be further spaced apart from each other. In particular, the first fiber bundles that define the opening have first, optionally linearly or generally linear extending sections and a second section that is arranged in a course to define a bay or swell. The second section, thus, may define substantially one half of a circumference. The other half or, generally, the remaining part of the circumference may be defined by another second section forming a mirrored bay or simply by another linearly extending fiber bundle.

One of the advantages of the disclosure herein is that at least some of the first fiber bundles continuously extend from one side to the other side of the opening along the circumference of the opening. Thereby, mechanical load can be transferred in an improved manner around the opening.

According to some embodiments, the bay may have the form of an arc, e.g. a semicircle or a segment of an ellipse, a triangle, a rectangle, or a trapezoid.

According to some embodiments, the functional structure may be formed of a second fiber composite material that includes a plurality of second fiber bundles embedded in a second matrix material, wherein the second fiber bundles are different from the first fiber bundles. The second matrix material, for example, may be the same as the first matrix material. The second fiber bundles may be made of a different material than the first fiber bundles. That is, different physical properties of the fiber composite structure can be realized in different areas of the composite structure. One advantage of providing the functional structure in the form of a second fiber composite material is that joining between the functional structure and the base structure is further eased and that the functional structure can transfer an increased amount of mechanical loads.

According to some embodiments, the second fiber bundles include quartz fibers, glass fibers, tellurite fibers, polymer fibers, or PMMA fibers.

"PMMA" is an abbreviation for "Poly(methyl methacrylate)". According to some embodiments, in a predefined frequency range, the second fiber composite material has a higher electromagnetic transmittance than the first fiber composite material. The predefined frequency range may include, depending on the case of application, for example, the microwave, optical or infra-red frequency range. In the predefined range, the transmittance of the second fiber composite material may, for example, be greater or equal than 0.4, in particular greater or equal than 0.5, and preferably greater or equal than 0.7.

According to some embodiments, end regions of the second fiber bundles may be positioned between the first sections of the first fiber bundles. That is, the second fiber bundles may extend continuously through the complete opening and end between the optionally linear first sections of the first fiber bundles. For example, at least some of the second bundles may end at different positions with regard to the longitudinal extent of the first fiber bundles. Since the second fiber bundles extend through the opening and end between the first sections of the first fiber bundles, the second fiber bundles are able to take a further increased amount of mechanical load. Thus, mechanical strength of the fiber composite structure is at least maintained or even further increased.

According to some embodiments, the functional structure may include a solid body, for example, in the form of a block or cylinder.

According to some embodiments, the functional structure may include a carrier frame defining an inner opening in which the solid body is fixed, wherein the carrier frame with an outer circumference is joined with the first fiber composite material of the base structure. The solid body either may be directly fixed within the inner opening or by an inner frame that holds the solid body. According to some embodiments, the carrier frame is a sleeve including, on a first end, a first rim or collar and/or, on a second end, a second rim or collar. The rim(s) or collar(s) help to further improve adhesion to the base structure. The rim(s) or collar(s) may optionally be provided with a surface texture to further increase adhesion between the first matrix material and the frame.

According to some embodiments, the solid body may be made of a material that has, in a predefined frequency range, a higher transmittance than the first fiber composite material. The predefined frequency range may include, depending on the case of application, for example, the microwave, optical or infra-red frequency range. In the predefined range, the transmittance of the solid body may, for example, be greater or equal than 0.4, in particular greater or equal than 0.5, and preferably greater or equal than 0.7.

According to some embodiments, the solid body is made of glass, PMMA, or other materials that are similar transparent in the given frequency range.

According to some embodiments, the first fiber bundles of the first composite material include carbon fibers or glass fibers.

According to some embodiments, the first fiber bundles may be positioned as pre-preg tapes in which the first fiber bundles are pre-impregnated with the first matrix material. In alternative embodiments, the fiber bundles may be positioned as dry first fiber bundles which are further infiltrated with a first matrix material before or after positioning of the functional structure.

According to some embodiments, in the step of preparing the base structure, the first fiber bundles are laid down so as to extend linearly or generally linear and/or with generally constant spacing and, after being laid down, the fiber bundles in the second sections are moved so as to form the bay. For example, the fiber bundles may be laid down to a support surface of a tool, in particular, by a fiber placement head moving along the support surface. After placing the fibers, the opening may be generated by moving the fibers away from each other in a predefined spot, e.g. by a mandrel.

According to other embodiments, in the step of preparing the base structure, the first fiber bundles may be laid down in a course that the first sections extend linearly or generally linear and/or with generally constant spacing, and the second sections form the bay. For example, a fiber placement head may be moved along a support surface to lay the fibers down on the support surface, wherein the fiber placement head is controlled such that it lays down the fiber bundles in a course that includes linear sections interconnected by a section forming a bay.

According to some embodiments of the disclosure herein, the opening of the base structure may have a diameter within a range between 0.5 cm and 20 cm, optionally between 0.5 cm and 10 cm.

The features and advantages disclosed herein for one aspect of the disclosure herein are also disclose for the other aspect of the disclosure herein.

BRIEF DESCRIPTION OF THE DRAWINGS

The disclosure herein will be explained in greater detail with reference to exemplary embodiments depicted in the drawings as appended.

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. Like reference numerals designate corresponding or similar parts.

FIG. 1 schematically illustrates a tank system comprising a fiber composite structure according to an embodiment of the disclosure herein.

FIG. 2 schematically illustrates a fiber composite structure according to an embodiment of the disclosure herein.

FIG. 3 schematically illustrates a cross-sectional view of fiber composite structure according to an embodiment of the disclosure herein in the region of an opening.

Figure 4:
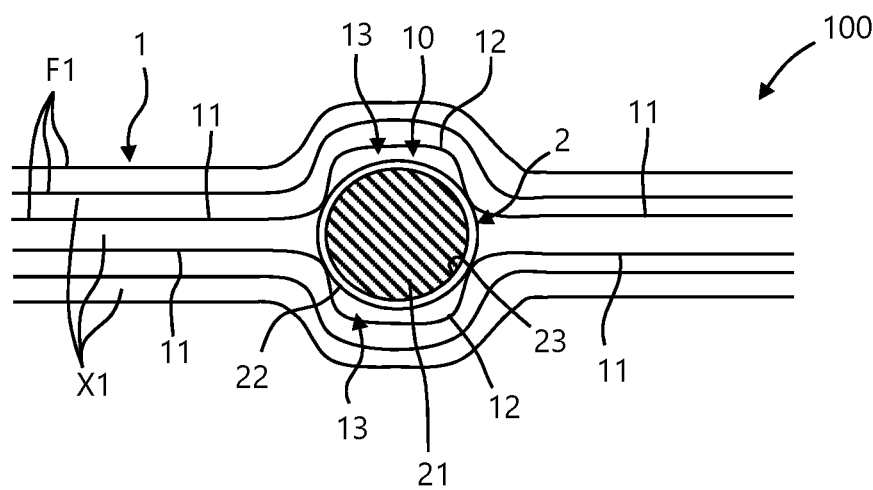
FIG. 4 schematically illustrates a cross-sectional view of fiber composite structure according to another embodiment of the disclosure herein in the region of the opening.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

FIG. 1 exemplarily shows a tank system 200 including a tank 205 and a sensor 210. The tank 205, as shown, may have a cylindrical shape or any other shape suitable to define an inner volume for storing gaseous or liquid fuel therein.

For example, the tank 205 may be configured to store liquid hydrogen. Hydrogen, at a pressure in the range between 4 to 6 bar, is in a liquid state at temperatures of approximately −253° C. Of course, the tank 205 is not limited to this temperature and/or pressure range. For example, the tank 205 may be configured to withstand pressures up to 700 bar. Not only for storing liquid hydrogen but, generally, it is desirable that the tank 205 is reliably sealed and mechanically stable. Further, it would be advantageous to measure various physical quantities and/or states in the interior of the tank 205 without compromising mechanical stability or leak tightness.

The tank 205 shown in FIG. 1 may be formed of or comprise a fiber composite structure 100 that includes a base structure 1 and a functional structure 2 positioned and joined in an opening 10 of the base structure. In the specific example of FIG. 1, the functional structure 2 may be a window that is transparent for electromagnetic waves in a predefined frequency range. The sensor 210 may be arranged opposite the functional structure 2 and configured to measure a physical quantity, e.g. the temperature, and/or a filling level of the tank 205 by emitting waves through the window in the predefined frequency range.

The tank system 200 shown in FIG. 1 is one example for applying a fiber composite structure 100 of the disclosure herein. However, the disclosure herein is not limited thereto. The fiber composite structure 100 of the disclosure herein may be useful in various applications, such as antennas, radomes, and so on.

FIG. 2 schematically illustrates a fiber composite structure 100 including base structure 1 and a functional structure 2. Generally, the base structure 1 may comprise an areal expanse with a first surface 1a and an opposite second surface 1b. For example, the base structure 1 may be a plate, a shell, a skin or similar. The base structure 1 further includes an opening 10 which may, for example, be circular as exemplarily shown in FIG. 1. Alternatively, the opening 10 may be elliptical, rectangular, trapezoidal, triangular, or may have any other desired shape with a closed circumference. Generally, the opening 10 may extend between the first and the second surface 1a, 1b.

The base structure 1 is formed of a first fiber composite material that includes a plurality of first fiber bundles F1 embedded in a first matrix material X1. The first fiber bundles F1 may, for example, include carbon fibers or glass fibers. The first matrix material X1 may be a thermoplastics or thermoset resin. In more detail, the base structure 1 may be formed from a plurality of layers or sheets that are stacked over each other. Each layer includes a plurality of fiber bundles F1 and the first matrix material X1 forms a monolithic unit embedding the fiber bundles F1 of all layers.

FIGS. 3 and 4 both show schematic cross-sectional views of the fiber composite structure 100 when cutting the base structure 1 between adjacent layers or sheets. As shown in FIGS. 3 and 4, to define the opening 10 of the base structure 1, a spacing between adjacent first fiber bundles F1 is locally increased. In detail, the first fiber bundles F1 that define or delimit the opening 10 include two first sections 11 that may extend linearly or substantially linear and a second section 12 that interconnects the first sections 11. In particular, the second section 12 continuously or uninterruptedly interconnects the first sections 11. That is, one continuous, uninterrupted fiber bundle F1 includes as length portions arranged adjacent to each other the first section 11, the second section 12, and the further first section 11. As shown in FIGS. 3 and 4, the second section 12 extends so as to form a bay 13. The bay 13 defines or forms a part of the circumference of the opening 10. In FIGS. 3 and 4 it is exemplarily shown that the circumference of the opening 10 is defined by two mirrored bays 13 of generally semi-circular shape. Alternatively, only one bay 13 may be provided and the remaining circumference 10 may be defined by a linear extending section of a respective first fiber bundle F1. Without limiting the disclosure herein, the bay 13 may have the form of an arc, such as a semicircle or a segment of an ellipse, a triangle, a rectangle, or a trapezoid.

The course of the first fiber bundles F1 as described above by reference to FIGS. 3 and 4 may be present in at least some of the layers of the base structure 1, wherein it may be provided that the first sections 11 in neighbouring layers extend in different directions, in particular, in directions that run angled to each other, e.g. with an angle of 45 or 90 degrees.

As visible in FIGS. 3 and 4, the first fiber bundles F1 that define the opening 10 extend continuously around the void formed between the fiber bundles F1. Thereby, mechanical load or stress can be distributed over the areal expanse of the base structure 1 more uniform. Consequently, the mechanical strength of the base structure is increased.

The functional structure 2 is positioned in the opening 10 of the base structure 1 and joined with the first fiber composite material of the base structure 1.

As exemplarily shown in FIG. 3, the functional structure 2 may be formed of a second fiber composite material. The second fiber composite material may include a plurality of second fiber bundles F2 embedded in a second matrix material X2. The second fiber bundles F2, generally, are different from the first fiber bundles F1. For example, second fiber bundles F2 may include quartz fibers, glass fibers, tellurite fibers, polymer fibers, or PMMA fibers. The second matrix material X2, preferably, may be the same as the first matrix material X1, however, is not limited thereto. Optionally, the second fiber composite material, in a predefined frequency range, the second fiber composite material may have a higher electromagnetic transmittance than the first fiber composite material. For example, in the tank system 200 shown in FIG. 1, the second fiber composite material may have a transmittance of greater or equal than 0.4, preferably greater or equal than 0.5 for electromagnetic waves in the frequency range as emitted by the sensor 205.

Referring again to FIG. 3, it is shown that the second fiber bundles F2 extend through or span over the opening 10. In particular, the second fiber bundles F2 continuously extend between opposite end regions 20A, 20B. The end regions 20A, 20B of the second fiber bundles F2 may extend linearly and may be positioned between the first sections 11 of the first fiber bundles F1 as schematically shown in FIG. 3. As is further visible in FIG. 3 some of the second fiber bundles F2 may also have an intermediate portion 20C that generally follows or extends substantially parallel to the second portions 12 of the first fiber bundles F1. Other intermediate portions 20C extend linearly, too. It should be noted that the second fiber bundles F2 within one layer do not cross one another. Optionally, at least some of the second fiber bundles F2 may end between the first sections 11 of the first fiber bundles F1 at different locations with regard to the direction along which the preferably linear first sections 11 of the first fiber bundles F1 extend, as schematically shown in FIG. 3. As is further shown in FIG. 3, there may optionally be provided first fiber bundles F1' that end adjacent to the ends of the second fiber bundles F2.

FIG. 4 exemplarily shows a fiber composite structure 100 that differs from that of FIG. 3 in that the functional structure 2 is not formed from a fiber composite material but includes a solid body 21. The solid body 21 may be realized as a cylinder, as exemplarily shown in FIG. 4. However, other shapes such as, for example, a block shape, a plate shape or similar, are possible of course. The solid body 21 may, for example, be a lens or another optical structure. Some examples of a material of which the solid body 21 is made include glass or PMMA. More generally, the solid body 21 may be made of a material that has, in a predefined frequency range, a higher electromagnetic transmittance than the first fiber composite material of the base structure 1.

Figure 5:
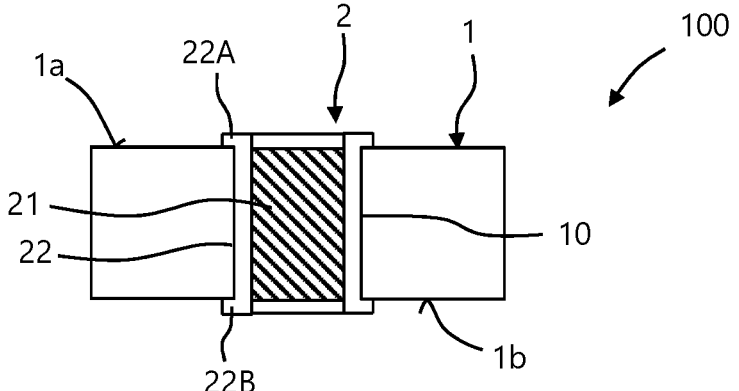
FIG. 5 schematically illustrates a further cross-sectional view of the fiber composite structure of FIG. 4.

As further shown in FIG. 4, the solid body 21 may optionally be held by a carrier frame 22. The carrier frame 22 may, for example, be realized as a sleeve as schematically shown in FIG. 5. Generally, the carrier frame 22 includes an inner opening 23 in which the solid body 21 is fixed. For example, the inner circumference of the opening 23 may correspond to the outer circumference of the solid body 21 which, in this case, is directly attached or joined with the carrier frame 22. Alternatively, the solid body 21 may be attached to an intermediate or inner frame which, in turn, with its outer circumference is fixed within the opening 23 of the frame 22, e.g. by welding or similar. The solid body 21 either alone or fixed within the carrier frame 22, as shown in FIG. 4, is located in the opening 10 of the base structure 1 and joined with the first matrix material X1. For example, an outer circumference 24 of the carrier frame 22 may be joined with the first matrix material X1. For example, in the tank system 200 shown in FIG. 1, the solid body 21 may have a transmittance of greater or equal than 0.4, preferably greater or equal than 0.5 for electromagnetic waves in the frequency range as emitted by the sensor 205.

FIG. 5 shows a cross-sectional view of the fiber composite structure 100 shown in FIG. 4. As exemplarily shown in FIG. 5, the carrier frame 22 may include, on a first end, a first rim or collar 22A and, on a second end, a second rim or collar 22B. Of course, it may be provided that only one of the first or second collars 22A, 22B is formed on the carrier frame 22. The collars 22A, 22B may be in contact with the surfaces 1a, 1b of the base structure 1 and, in particular, may be joined with the first matrix material X1.

Figure 6:
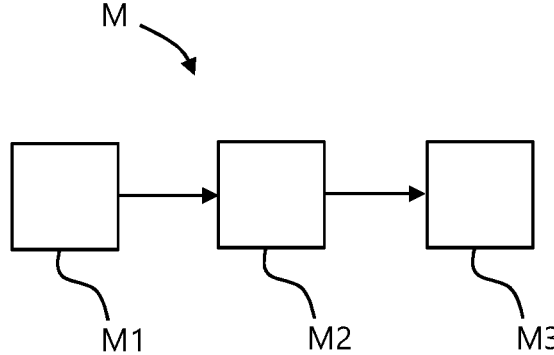
FIG. 6 schematically illustrates a flow diagram of a method for manufacturing a fiber composite structure according to an embodiment of the disclosure herein.

FIG. 6 shows a flowchart of a method M for manufacturing a fiber composite structure 100. The method M, by way of example, will be explained by reference to the fiber composite structures 100 discussed above.

In step M1 the base structure 1 is prepared by positioning a plurality of first fiber bundles F1 such that a course of the fiber bundles F1 as shown in FIG. 3 or 4 is achieved. In detail, a plurality of fiber bundles F1 is placed such that at least some of first fiber bundles F1 have first sections 11 that preferably extend linear or substantially linear, and a second section 12 that continuously or uninterruptedly interconnects the first sections 11, wherein the second section 12 forms a bay 13 that defines a part of the circumference of the opening 10 of the base structure 1. In step M1, the first fiber bundles F1, for example, may be placed or laid down onto a surface of a tool by a fiber placement head.

According to one option, the first fiber bundles may be laid down in step M1 so as to extend generally constant spacing between them, that is, without the bay 13 being formed. After being laid down, the optionally linearly extending fiber bundles F1 in the second sections 12 may be moved away from each other so as to form the bay or bays 13 that define the opening 10. For example, a mandrel may be pushed through a gap between adjacent fiber bundles F1 to form the opening 10.

According to another option, the first fiber bundles F1, in step M1, may be laid down directly in a course that the first sections 11 extend with constant spacing and the second sections 12 form the bay 13.

In step M1, the first fiber bundles F1 may be positioned or laid down as pre-preg tapes in which the first fiber bundles F1 are pre-impregnated with the first matrix material X1. Alternatively, the fiber bundles F1 may also be placed as dry first fiber bundles F1.

In step M2, the functional structure 2 is positioned within the opening 10 of the base structure 1. Depending on the configuration of the functional structure 2, this may include placing the solid body 21 or the carrier frame 22 with the solid body 21 held therein into the opening 10 of the base body, or laying down the second fiber bundles F2 so that they traverse the opening 10, for example, as discussed above by reference to FIG. 3. The second fiber bundles F2 may be placed or laid down as pre-preg tapes in which the second fiber bundles F2 are pre-impregnated with the second matrix material X2. Alternatively, the second fiber bundles F2 may also be placed as dry second fiber bundles F2.

As discussed above, the second fiber bundles F2 or the solid body 21 may be placed or positioned after having formed the base structure 1 with the opening 10 therein. Alternatively, the disclosure herein also covers a method in which the second fiber bundles F2 or the solid body 21 may be placed or positioned first to form the functional structure 2 and, afterwards, the first fiber bundles F1 are laid down to form the base structure 1 in which the opening 10 is built around the functional structure. According to this alternative step M2 includes step M1.

In the case that the first fiber bundle F1 have been laid down as dry fiber bundles F1, a step of infiltrating the first fiber bundles F1 with the first matrix material M1 may be carried out, preferably after positioning M2 of the functional structure 2. In the case that the second fiber bundle F2 have been laid down as dry fiber bundles F2, a step of infiltrating the second fiber bundles F2 with the respective matrix material M2 may be carried out. Optionally, both, the first and the second fiber bundles F1, F2 may be laid down as dry fiber bundles which are infiltrated in a common infiltration step with the same matrix material.

In step M3, the functional structure 2 and the base structure 1 are joined by curing the first matrix material X1. Before joining, the first matrix material X1 and, if applicable, the second matrix material X2, too, are in an at least partially uncured state. By curing, e.g. by applying a predefined temperature treatment, the matrix material(s) X1, X2 form a uniform, monolithic block that embeds the first fiber bundles F1 and, if applicable, the second fiber bundles F2. In case that the functional structure 2 is a solid body 21, the first fiber material F1 may directly adhere to the solid body 21 or to the carrier frame 22 which, optionally, may be provided with a surface texture, e.g. in the form of grooves, ripples, roughness, or similar, to improve adhesion between the first matrix material X1 and the carrier frame 22.

One of the advantages of the fiber composite structures 100 discussed above is that they are able to withstand high mechanical loads although the base structure 1 is provided with an opening 10 in which the functional structure 2 is placed. In particular, the course of the first fiber bundles F1 with preferably linear first sections 11 and a bay section 12 is advantageous because the fiber bundles F1 are not interrupted by the opening 10 but continuously extend around or bypass the opening.

Although specific embodiments have been illustrated and described herein, it will be appreciated by those of ordinary skill in the art that a variety of alternate and/or equivalent implementations may be substituted for the specific embodiments shown and described without departing from the scope of the disclosure herein as defined by the appended claims.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the seat modules and aircraft infrastructure can be applied accordingly to the aircraft or spacecraft according to the disclosure herein and the method according to the disclosure herein, and vice versa.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 base structure
1a first surface
1b second surface
2 functional structure
10 opening
11 first sections
12 second section
13 bay
20A, B end regions of second fiber bundles
21 solid body
22 carrier frame
22A first rim or collar
22B second rim or collar
23 inner opening
24 outer circumference
100 fiber composite structure
200 tank system
205 tank
210 sensor
F1 first fiber bundles
F2 second fiber bundles M method
M1-M3 method steps
X1 first matrix material
X2 second matrix material

The invention claimed is:

1. A fiber composite structure, comprising:
a base structure comprising:
    a first fiber composite material that includes first fiber bundles embedded in a first matrix material; and
    an opening defined by the first fiber bundles;
    wherein a portion of the first fiber bundles each comprise first sections that are on opposite sides of the opening, the first sections that are on opposite sides of the opening extending away from each other and away from the opening in opposite directions;
    wherein the portion of the first fiber bundles each comprise a second section that passes circumferentially around the opening and forms a bay that defines a part of a circumference of the opening; and
    wherein the second section continuously or uninterruptedly interconnects the first sections of a same fiber in the portion of the first fiber bundles; and
a functional structure positioned in the opening of the base structure and joined with the first fiber composite material of the base structure.

2. The fiber composite structure according to claim 1, wherein the bay has a form of an arc, a triangle, a rectangle, or a trapezoid.

3. The fiber composite structure according to claim 1, wherein the functional structure is formed of a second fiber composite material that includes second fiber bundles embedded in a second matrix material, wherein the second fiber bundles are different from the first fiber bundles.

4. The fiber composite structure according to claim 3, wherein the second fiber bundles include quartz fibers, glass fibers, tellurite fibers, polymer fibers, or PMMA fibers.

5. The fiber composite structure according to claim 3, wherein, in a predefined frequency range, the second fiber composite material has a higher electromagnetic transmittance than the first fiber composite material.

6. The fiber composite structure according to claim 3, wherein end regions of the second fiber bundles are positioned longitudinally between the first sections of the first fiber bundles.

7. The fiber composite structure according to claim 1, wherein the functional structure includes a solid body.

8. The fiber composite structure according to claim 7, wherein the functional structure includes a carrier frame defining an inner opening in which the solid body is fixed, wherein the carrier frame with an outer circumference is joined with the first fiber composite material of the base structure.

9. The fiber composite structure according to claim 8, wherein the carrier frame is a sleeve including, on a first end, a first rim or collar and/or, on a second end, a second rim or collar.

10. The fiber composite structure according to claim 7, wherein the solid body is made of a material that has, in a predefined frequency range, a higher electromagnetic transmittance than the first fiber composite material.

11. The fiber composite structure according to claim 7, wherein the solid body is made of glass or PMMA.

12. The fiber composite structure according to claim 1, wherein the first fiber bundles of the first composite material include carbon fibers or glass fibers.

13. A method for manufacturing a fiber composite structure, comprising:

preparing a base structure, which comprises first fiber bundles embedded in a first matrix material, by positioning the first fiber bundles to define an opening, wherein:

a portion of the first fiber bundles each comprise first sections that are on opposite sides of the opening, the first sections that are on opposite sides of the opening extending away from each other and away from the opening in opposite directions:

the portion of the first fiber bundles each comprise a second section that passes circumferentially around the opening and forms a bay that defines a part of a circumference of the opening; and the second section continuously or uninterruptedly interconnects the first sections of a same fiber in the portion of the first fiber bundles;

positioning a functional structure within the opening of the base structure; and joining the functional structure and the base structure by curing the first matrix material, in which the first fiber bundles are embedded.

14. The method according to claim 13, wherein the first fiber bundles either are positioned as pre-preg tapes in which the first fiber bundles are pre-impregnated with the first matrix material or are positioned as dry first fiber bundles which are further infiltrated with a first matrix material before or after positioning of the functional structure.

15. The method according to claim 13, wherein, in preparing the base structure, the first fiber bundles are laid down to extend substantially linearly and/or with generally constant spacing and, after being laid down, the fiber bundles, in the second sections, are moved to form the bay, or the first fiber bundles are laid down in a course that the first sections extend linearly and/or with generally constant spacing, and the second sections form the bay.

16. A fiber composite structure, comprising:

a base structure being formed of a first fiber composite material that includes first fiber bundles embedded in a first matrix material, wherein the base structure comprises an opening defined by first fiber bundles which include first sections and a second section that continuously or uninterruptedly interconnects the first sections, wherein the second section forms a bay that defines a part of the circumference of the opening; and a functional structure positioned in the opening of the base structure and joined with the first fiber composite material of the base structure;

wherein the functional structure includes a solid body; and wherein:

the functional structure includes a solid body; or the solid body is made of a material that has, in a predefined frequency range, a higher electromagnetic transmittance than the first fiber composite material.

17. The fiber composite structure according to claim 16, wherein the carrier frame is a sleeve including, on a first end, a first rim or collar and/or, on a second end, a second rim or collar.

\* \* \* \* \*